United States Patent
Nasu et al.

(10) Patent No.: US 9,663,006 B2
(45) Date of Patent: May 30, 2017

(54) VEHICLE SEAT

(71) Applicants: TOYOTA BOSHOKU KABUSHIKI KAISHA, Aichi-ken (JP); TOKAI CHEMICAL INDUSTRIES, LTD., Gifu (JP)

(72) Inventors: Hiroyuki Nasu, Aichi-ken (JP); Koki Uemura, Gifu-ken (JP)

(73) Assignees: TOYOTA BOSHOKU KABUSHIKI KAISHA, Aichi-Ken (JP); TOKAI CHEMICAL INDUSTRIES, LTD., Gifu (JP)

( * ) Notice: Subject to any disclaimer, the term of this patent is extended or adjusted under 35 U.S.C. 154(b) by 21 days.

(21) Appl. No.: 14/694,425

(22) Filed: Apr. 23, 2015

(65) Prior Publication Data

US 2015/0306997 A1 Oct. 29, 2015

(30) Foreign Application Priority Data

Apr. 25, 2014 (JP) ................................. 2014-091097

(51) Int. Cl.
*B60N 2/42* (2006.01)
*B60N 2/48* (2006.01)
(Continued)

(52) U.S. Cl.
CPC ......... *B60N 2/4885* (2013.01); *B60N 2/4228* (2013.01); *B60N 2/42709* (2013.01); *B60N 2/48* (2013.01); *B60N 2/7017* (2013.01)

(58) Field of Classification Search
CPC . B60N 2/4885; B60N 2/4228; B60N 2/42709
(Continued)

(56) References Cited

U.S. PATENT DOCUMENTS 2,864,433 A * 12/1958 Schnoor ................... A47C 7/38
297/404
3,205,005 A * 9/1965 Brown ................. B60N 2/4879
297/216.12
(Continued)

FOREIGN PATENT DOCUMENTS

CN 103459199 12/2013
CN 103502048 1/2014
(Continued)

OTHER PUBLICATIONS

Official Action, along with English-language translation thereof, in DE Appl. No. 10 2015 207 528.1 dated Sep. 6, 2016.
(Continued)

*Primary Examiner* — Laurie K Cranmer
(74) *Attorney, Agent, or Firm* — Greenblum & Bernstein, P.L.C.

(57) ABSTRACT

A vehicle seat provided in a vehicle includes a headrest with a pad in which an insert member is provided at a portion at which a head of an occupant is received. The insert member has rigidity that is higher than rigidity of the pad. When a rear-side collision occurs in the vehicle in a state in which the head of the occupant is away from the headrest and an inertia force applied to the occupant, the insert member allows the head of the occupant to sink into the headrest after the head of the occupant comes in contact with the headrest.

13 Claims, 6 Drawing Sheets

(51) Int. Cl.
*B60N 2/427* (2006.01)
*B60N 2/70* (2006.01)

(58) Field of Classification Search
USPC .................. 297/216.12–216.14, 391, 472
See application file for complete search history.

(56) References Cited

U.S. PATENT DOCUMENTS

| | | | | |
|---|---|---|---|---|
| 4,744,601 | A * | 5/1988 | Nakanishi | B60N 2/48 297/216.12 |
| 5,580,124 | A * | 12/1996 | Dellanno | B60N 2/4802 297/216.12 |
| 5,961,182 | A * | 10/1999 | Dellanno | B60N 2/4228 297/216.12 |
| 7,537,282 | B2 * | 5/2009 | Veine | B60N 2/4885 297/216.12 |
| 8,534,703 | B1 * | 9/2013 | Baldwin | B60R 21/207 280/730.2 |
| 8,857,904 | B2 * | 10/2014 | Gaeng | B60N 2/4882 297/216.12 |
| 8,919,877 | B2 * | 12/2014 | Eisenbraun | B60N 2/48 297/216.12 |
| 9,238,427 | B2 * | 1/2016 | Baumgarten | B60N 2/4805 |
| 2004/0256904 | A1 | 12/2004 | Takei | |
| 2008/0073886 | A1 * | 3/2008 | Palm | B60N 2/4885 280/730.1 |
| 2008/0164730 | A1 * | 7/2008 | Watson | B60N 2/48 297/216.12 |
| 2009/0315372 | A1 * | 12/2009 | Tracht | B60N 2/42709 297/216.12 |
| 2011/0198899 | A1 * | 8/2011 | Hertl | B60N 2/48 297/216.12 |
| 2013/0076086 | A1 * | 3/2013 | Pickett | B60N 2/48 297/216.12 |
| 2013/0300166 | A1 * | 11/2013 | Munemura | B60N 2/4885 297/216.12 |
| 2014/0217788 | A1 * | 8/2014 | Norwood | B60R 21/233 297/216.12 |
| 2014/0368008 | A1 * | 12/2014 | Mizobata | B60N 2/4808 297/216.12 |

FOREIGN PATENT DOCUMENTS

| | | |
|---|---|---|
| CN | 203472617 | 3/2014 |
| DE | 10 2010 054 651 | 6/2012 |
| DE | 10 2012 000 426 | 7/2013 |
| DE | 10 2012 217 244 | 8/2013 |
| JP | 2006-69286 | 3/2006 |

OTHER PUBLICATIONS

Official Action, along with English-language translation thereof, in CN Appl. No. 201510201353.2 dated Nov. 28, 2016.

* cited by examiner

VEHICLE SEAT

INCORPORATION BY REFERENCE

The disclosure of Japanese Patent Application No. 2014-091097 filed on Apr. 25, 2014 including the specification, drawings and abstract is incorporated herein by reference in its entirety.

BACKGROUND OF THE INVENTION

1. Field of the Invention

The invention relates to a vehicle seat and specifically to a vehicle seat including a headrest with a pad.

2. Description of Related Art

Figure 5:
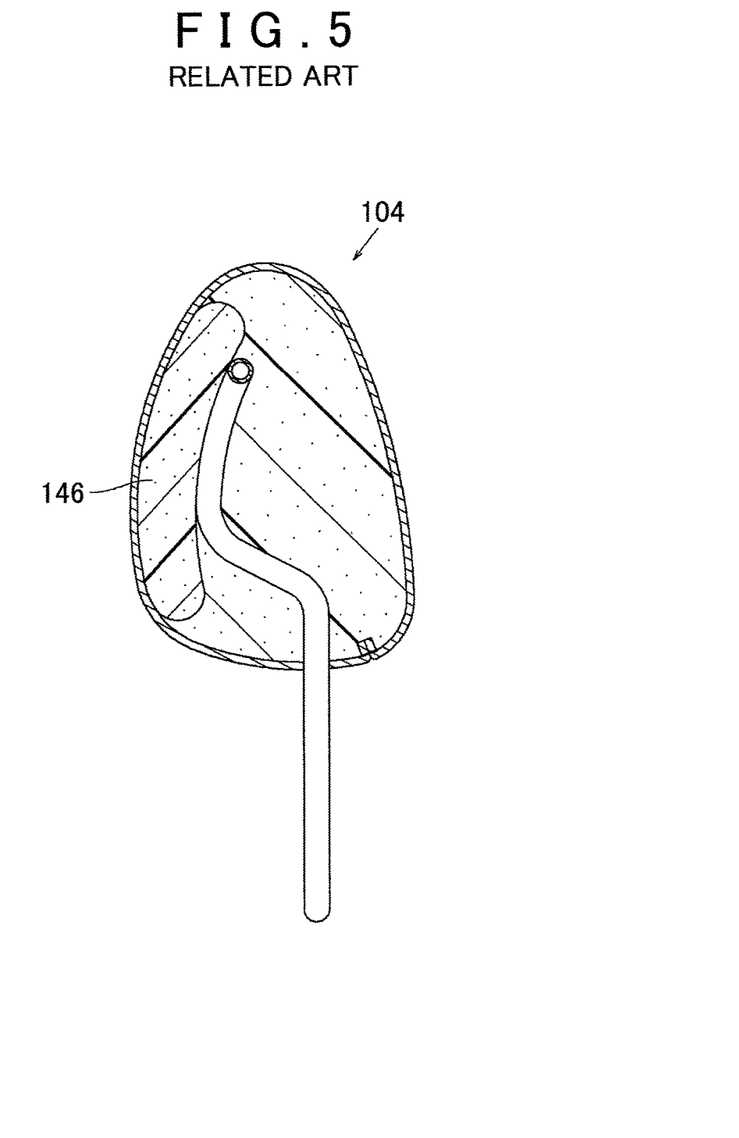
FIG. 5 is a vertical cross-sectional view of a headrest of a vehicle seat in the related art.

A typical seat back of a vehicle seat provided in a vehicle such as an automobile has a headrest attached thereto so as to be capable of receiving the head of an occupant. Such a headrest has a cushioned pad. Some pads have an insert member at a portion at which the head of an occupant is received. As shown in FIG. 5, Japanese Patent Application Publication No. 2006-69286 (JP 2006-69286 A) describes a headrest 104 in which an insert material 146 is made of a low-resilience material. With this configuration, the sinking of the front surface portion of the headrest 104 and the bouncing of the head of an occupant (both not shown) may be reduced when a rear-side collision occurs in an automobile. Therefore, the protection of the occupant may be improved.

In the case of a rear-side collision, however, an occupant is forced to move forward by the impact of the rear-side collision. At this time, the head of the occupant is away from the headrest 104. Therefore, acceleration generated when the occupant is forced to move forward is applied to the body of the occupant prior to the head of the occupant due to an inertia force applied to the occupant (see FIG. 6). As a result, the occupant is forced to tilt the head backward (i.e., a state in which the chin of the occupant is lifted that will be hereinafter referred to as a "backward-tilted state") toward a state in which the head of the occupant is bent backward. Then, the head put in the backward-tilted state is forced to come in contact with the headrest 104 and starts to sink into the headrest while being put in the backward-tilted state due to the inertia force continuously applied to the occupant. According to the headrest described in JP 2006-69286 A, when the head is forced to sink into the headrest in this way, a difference in the applied acceleration between the head and the body of the occupant (A1 in FIG. 6) remains great when a certain period of time elapses after the rear-side collision (time T in FIG. 6, for example). Therefore, a neck injury criterion (NIC) value calculated from the difference in the acceleration also remains great. This may negatively affect the body of the occupant.

In addition, when the head is forced to further sink into the headrest while being put in the backward-tilted state due to the inertia force continuously applied to the occupant, the rigidity of the low-resilience material also increases correspondingly and the head becomes difficult to sink into the headrest. If the sinking of the head is insufficient, the backward-tilted state may be maintained and cause negative affect on the body of the occupant.

SUMMARY OF THE INVENTION

The invention provides a vehicle seat capable of reducing negative affect on the body of an occupant at a rear-side collision.

A first aspect of the invention relates to a vehicle seat provided in a vehicle including a headrest with a pad in which an insert member is provided at a portion at which a head of an occupant is received. The insert member has rigidity that is higher than rigidity of the pad, and when a rear-side collision occurs in the vehicle in a state in which the head of the occupant is away from the headrest and an inertia force applied to the occupant, the insert member allows the head of the occupant to sink into the headrest after the head of the occupant comes in contact with the headrest.

The insert member may be deformed or broken to allow the head of the occupant to sink into the headrest after the head of the occupant comes in contact with the headrest.

A second aspect of the invention relates to a vehicle seat provided in a vehicle, including a headrest with a pad in which an insert member is provided at a portion at which a head of an occupant is received. The insert member has rigidity that is higher than rigidity of the pad, and the insert member is deformed or broken by a load applied when the head of the occupant sinks into the headrest after a rear-side collision occurs in the vehicle.

According to the above configurations, when a rear-side collision occurs in the vehicle, the occupant is forced to move forward by the impact of the rear-side collision. At this time, the head of the occupant is away from the headrest. Therefore, acceleration generated when the occupant is forced to move forward is applied to the body of the occupant prior to the head of the occupant due to the inertia force applied to the occupant. As a result, the occupant is forced to tilt the head backward. Then, the head put in the backward-tilted state is forced to come in contact with the headrest and starts to sink into the headrest while being put in the backward-tilted state due to the inertia force continuously applied to the occupant. At this time, the insert member of the headrest supports the head and acceleration is applied to the head via the insert member. Thus, a difference in the applied acceleration between the head and the body of the occupant when a certain period of time elapses after the rear-side collision can be reduced in a greater amount than the related art. Therefore, a NIC value calculated from the difference in the acceleration can also be reduced. In addition, the head is thereafter allowed to further sink into the headrest while being put in the backward-tilted state due to the inertia force continuously applied to the occupant. Therefore, the backward-tilted state of the head may be relaxed. As a result, negative affect on the body of an occupant can be reduced. In this case, the insert member may be deformed or broken by a load applied when the head sinks into the headrest. With this configuration, it is possible to allow the head to sink into the head rest.

The insert member may have a starting portion at which deformation or breakage of the insert member starts.

According to the above configuration, there is less likelihood that the deformation or the breakage of the insert member is not allowed. Therefore, the backward-tilted state of the head of the occupant may be more reliably relaxed. As a result, negative affect on the body of an occupant can be more reliably reduced.

The insert member may be embedded in a front surface of the pad.

According to the above configuration, no irregularities are formed on the front surface of the headrest. Accordingly, when the head of the occupant is received by the headrest, the occupant hardly has an uncomfortable feeling.

The pad may have a recess at the portion at which the head of the occupant is received, and the insert member may be attached to the recess of the pad. The insert member may have a groove. The insert member may be made of rigid urethane foam.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a description will be given, with reference to FIGS. 1 to 4, of an embodiment for carrying out the invention. A "vehicle seat 1" will be described in the following description. In addition, "top," "bottom," "front," "rear," "right," and "left" sides in the following description, respectively, represent "top," "bottom," "front," "rear," "right," and "left" directions in the figures described above, i.e., "top," "bottom," "front," "rear," "right," and "left" directions based on the vehicle seat 1 arranged in an automobile (not shown).

Figure 1:
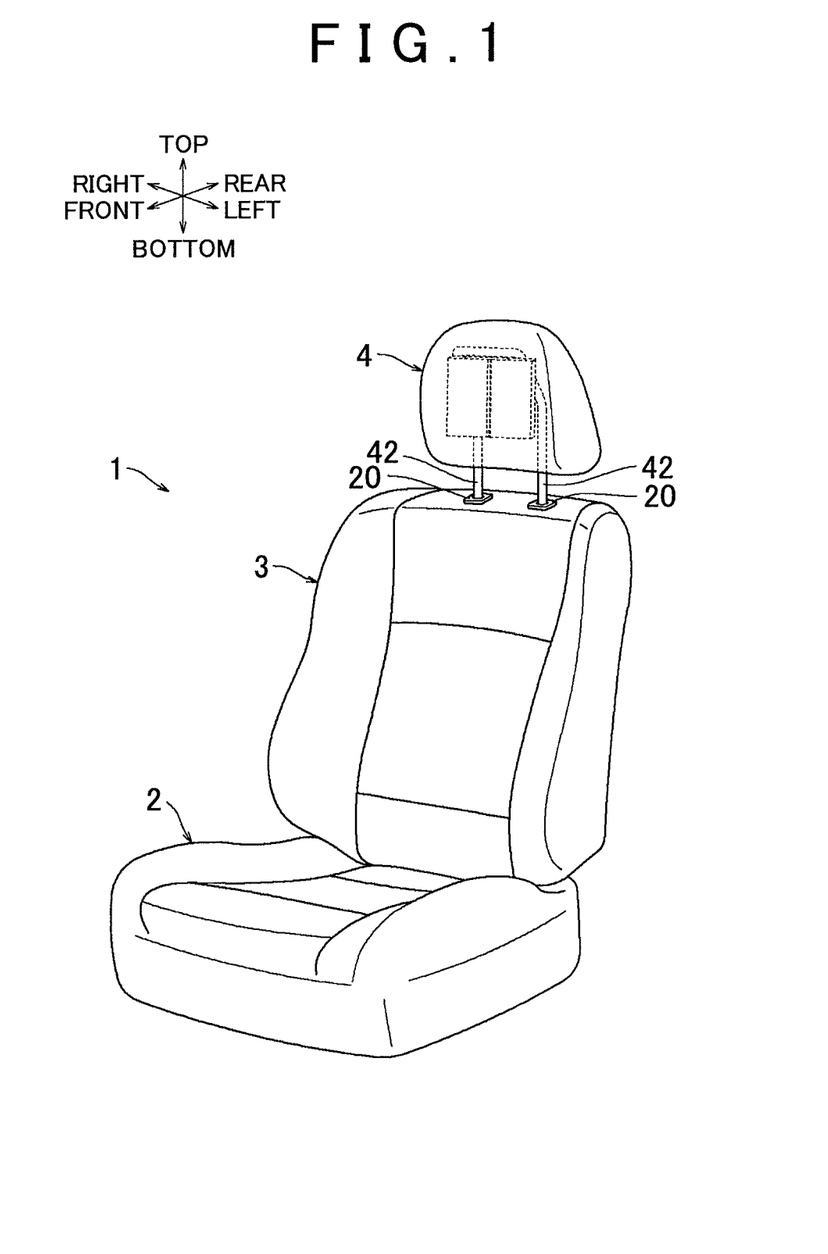
FIG. 1 is a perspective view of an entire vehicle seat according to an embodiment of the invention.

First, the configuration of the vehicle seat 1 will be described with reference to FIG. 1. The vehicle seat 1 is, for example, a seat provided in an automobile and includes a seat cushion 2 and a seat back 3 with a headrest 4. Here, the seat back 3 and the headrest 4 will be described in detail. Note that since the seat cushion 2 may be of a conventional type, its detailed description will be omitted.

To begin with, the seat back 3 will be described in detail. A pair of right and left holders (not shown) is attached by welding to the upper frame (not shown) of the back frame (not shown) of the seat back 3. Resin supports 20 allowing the insertion of right and left stays 42 of the headrest 4 that will be described later are attached to the right and left holders, respectively.

Figure 2:
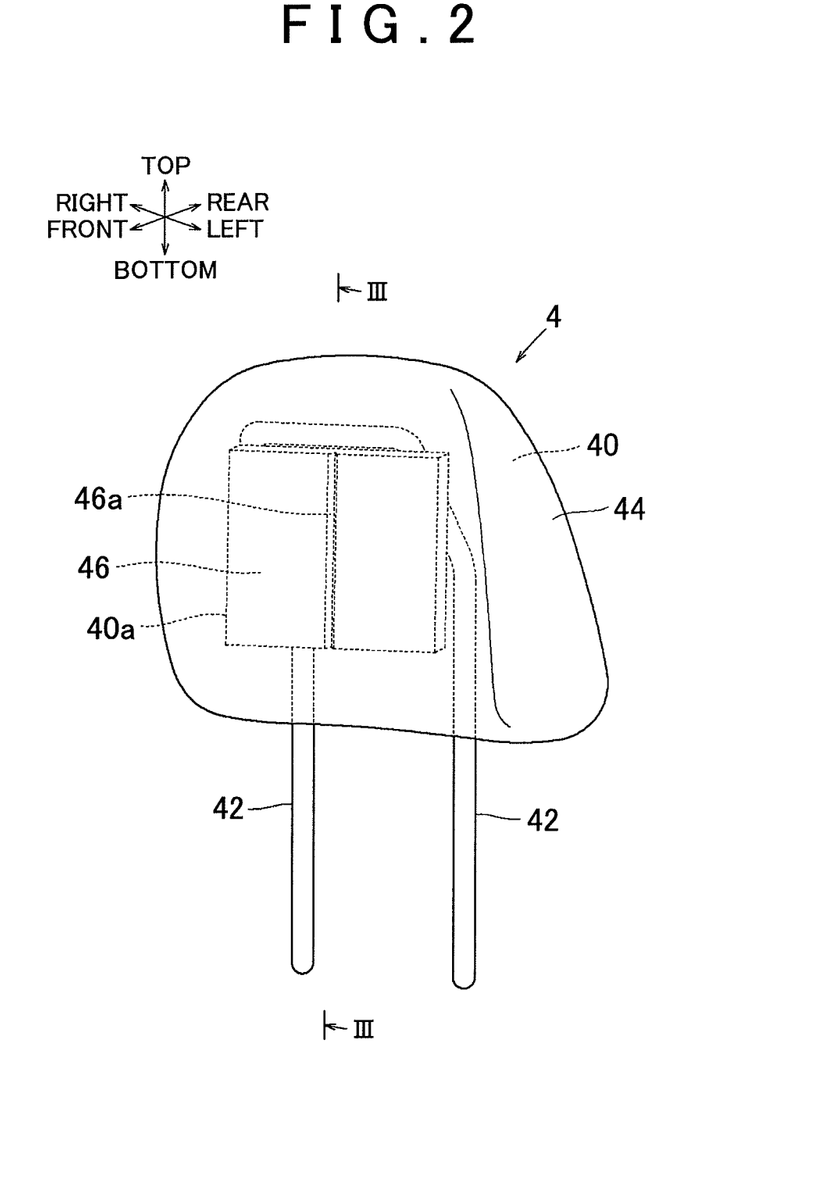
FIG. 2 is an enlarged view of a headrest in FIG. 1.
Figure 3:
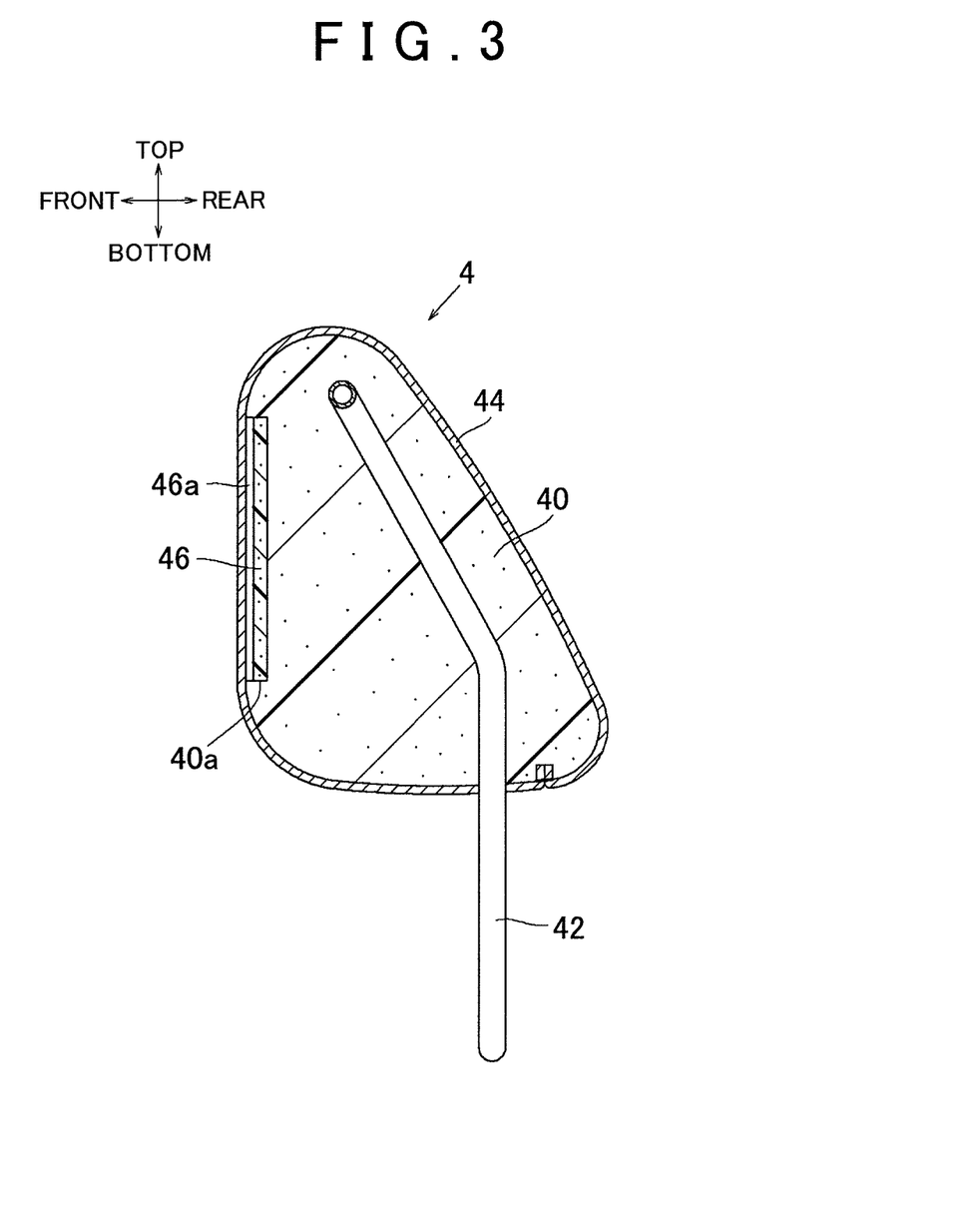
FIG. 3 is a vertical cross-sectional view of the headrest taken along line in FIG. 2.

Next, the headrest 4 will be described with reference to FIGS. 2 and 3. The headrest 4 has a cushion body capable of receiving the head of an occupant who sits on the vehicle seat 1. The headrest 4 has mainly a headrest main body 40 made of urethane foam as a pad and the pair of right and left stays 42 used to attach the headrest main body 40 to the upper portion of the seat back 3.

The headrest main body 40 has a substantially rectangle recess 40a at a portion on the front surface side thereof (portion at which the head of an occupant is received). An insert member 46 that has higher rigidity than the pad and is made of rigid urethane foam, which will be also referred to as a "rigid urethane foam 46", is attached to the recess 40a. Thus, the rigid urethane foam 46 receives the head of an occupant. The rigid urethane foam 46 has, on the front surface thereof, a groove 46a that extends in a top and bottom direction. The groove 46a serves as a "starting portion."

The outside surface of the headrest main body 40 having the rigid urethane foam 46 attached thereto is covered with a headrest cover 44. When the right and left stays 42 are, respectively, inserted in the supports 20 attached to the right and left shoulder portions of the seat back 3 and then one of the inserted stays 42 and one of the supports 20 are fixed to each other by a conventional locking mechanism (not shown), the installation of the headrest 4 in the seat back 3 is completed.

Note that the stay 42 and the support 20 are fixed to each other by the locking mechanism to allow the adjustment of the height position of the headrest 4 with respect to the seat back 3. That is, the stay 42 is fixed to the support 20 at any of a plurality of height positions thereof. In addition, the tip ends of the right and left stays 42 are formed in a tapered shape. Thus, since the tip ends of the right and left stays 42 are, respectively, guided into the supports 20 of the seat back 3 when the right and left stays 42 are, respectively, inserted in the supports 20 of the seat back 3, the operability of the inserting operation can be enhanced.

The headrest 4 configured as described above is manufactured in such a way that the rigid urethane foam 46 is attached to the molded headrest main body 40 in advance and then the headrest main body 40 having the rigid urethane foam 46 attached thereto is covered with the headrest cover 44.

Figure 4:
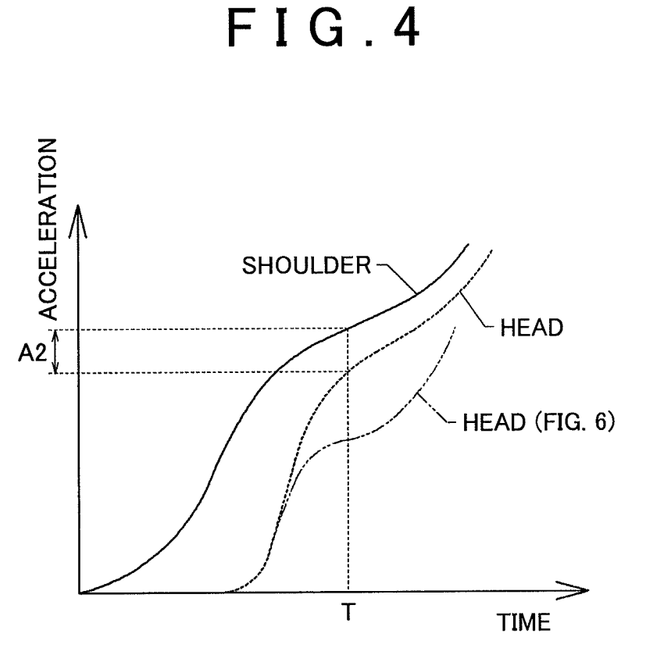
FIG. 4 is a graph showing the relationship between an NIC value and a time when a rear-side collision occurs in a vehicle having the vehicle seat in FIG. 1.

Next, the operation of the vehicle seat 1 having the above headrest 4 will be described with reference to FIG. 4. When a rear-side collision occurs in the automobile (that is, the automobile is struck from behind), the occupant of the vehicle seat 1 is forced to move forward by the impact of the rear-side collision. As in the related art, the head of the occupant is away from the headrest 4 at this time (a gap exists between the head of the occupant and the headrest 4). Therefore, acceleration generated when the occupant is forced to move forward is applied to the body of the occupant prior to the head of the occupant due to an inertia force applied to the occupant (see FIG. 4).

As a result, the occupant is forced to tilt the head backward toward a state in which the head of the occupant is bent backward. Then, the head put in the backward-tilted state is forced to come in contact with the headrest 4 (the gap between the backward-tilted head and the headrest 4 is eliminated) and starts to sink into the headrest 4 while being put in the backward-tilted state due to the inertia force continuously applied to the occupant. At this time, the rigid urethane foam 46 of the headrest 4 supports the head and acceleration is applied to the head via the rigid urethane foam 46.

Figure 6:
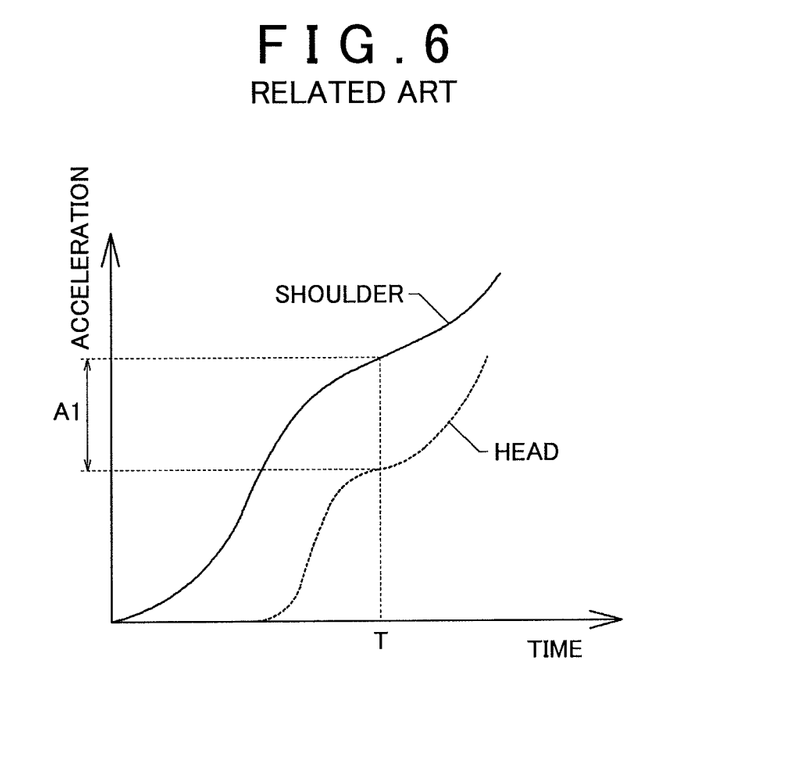
FIG. 6 is a graph showing the relationship between an NIC value and a time when a rear-side collision occurs in a vehicle having the vehicle seat in FIG. 5.

Thus, unlike the related art, a difference in the applied acceleration between the head and the body of the occupant (A2 in FIG. 4) when a certain period of time elapses after the rear-side collision (time T in FIG. 4, for example) can be reduced in a greater amount than the related art (A1 in FIG. 6). Therefore, a NIC value calculated from the difference in the acceleration can also be reduced.

Further, when the head is forced to further sink into the headrest 4 while being put in the backward-tilted state due to the inertia force continuously applied to the occupant, the load applied when the head sinks into the headrest 4 results in the breakage of the rigid urethane foam 46 that starts from the groove 46a. Thus, unlike the related art, since the (backward-tilted) head is allowed to sink into the headrest 4, the backward-tilted state of the head can be relaxed.

In the vehicle seat 1 according to the embodiment of the invention configured as described above, the rigid urethane foam 46 having higher rigidity than the pad is attached to the recess 40a at the portion on the front surface side of the headrest main body 40 (portion at which the head of an occupant is received). Here, the rigid urethane foam 46 has rigidity that restricts the sinking of the head into the headrest when a rear-side collision occurs. With this configuration, a difference in the applied acceleration between the head and the body of an occupant when a certain period of time elapses after the rear-side collision can be reduced in a greater amount than the related art. Therefore, a NIC value calculated from the difference in the acceleration can also be reduced. In addition, the rigid urethane foam 46 is broken by the load applied when the head of the occupant sinks into the headrest 4. Thus, since the head is allowed to sink into the headrest 4, the backward-tilted state of the head can be relaxed. Accordingly, negative affect on the body (particularly on the neck) of an occupant can be reduced.

In addition, according to the configuration, the rigid urethane foam 46 has, on the front surface thereof, the groove 46a that extends in the top and bottom direction. Therefore, failure in the breakage of the rigid urethane foam 46 is less likely to happen, and the backward-tilted state of the head of an occupant can be more reliably relaxed. Accordingly, negative affect on the body of an occupant can be more reliably reduced.

Moreover, according to the configuration, the headrest main body 40 has the substantially rectangle recess 40a at the portion on the front surface side thereof. The rigid urethane foam 46 having higher rigidity than the pad is attached to the recess 40a. That is, the rigid urethane foam 46 is embedded in the front surface of the headrest main body 40. Therefore, no irregularities are formed on the front surface of the headrest 4. Accordingly, when the head of an occupant is received by the headrest 4, the occupant hardly has an uncomfortable feeling.

The above information shows only one embodiment of the invention, but the invention is not limited to the information.

In the above embodiment, the "vehicle seat 1" provided in, for example, an automobile is described. However, the "vehicle seat" may be various vehicle seats such as "a ship seat," "an aircraft seat," and "a train seat."

In addition, in the above embodiment, the headrest 4 is manufactured in such a way that the rigid urethane foam 46 is attached to the molded headrest main body 40 in advance and then the headrest main body 40 having the rigid urethane foam 46 attached thereto is covered with the headrest cover 44. However, the invention is not limited thereto and the headrest 4 may be manufactured by expansion molding. In this case, there is a need to attach the rigid urethane foam 46 to a given position of the headrest cover 44 in advance.

Further, in the above embodiment, the rigid urethane foam 46 is broken to allow the head of an occupant to sink into the headrest 4. However, the invention is not limited thereto and the rigid urethane foam 46 may be deformed to allow the head of an occupant to sink into the headrest 4. Furthermore, in the above embodiment, the insert member made of rigid urethane foam is provided in the pad. However, the insert member may be made of a material other than rigid urethane foam as long as the insert member has higher rigidity than the pad.

What is claimed is:

1. A vehicle seat provided in a vehicle, the vehicle seat comprising:
   a headrest having a pad; and
   an insert member that is provided in the pad of the headrest at a portion of the headrest at which a head of an occupant is configured to be received, wherein
   the insert member has a rigidity that is higher than a rigidity of the pad,
   when a rear-side collision occurs in the vehicle and the head of the occupant is moved away from the headrest and an inertia force is applied to the occupant, the insert member allows the head of the occupant to sink into the headrest after the head of the occupant comes in contact with the headrest, and
   the insert member includes a groove that penetrates to and terminates at a predetermined depth in a planar front surface of the insert member that faces the head of the occupant during the rear-side collision.

2. The vehicle seat according to claim 1, wherein the insert member is at least one of deformed and broken to allow the head of the occupant to sink into the headrest after the head of the occupant comes in contact with the headrest.

3. The vehicle seat according to claim 1, wherein the groove is a starting portion at which at least one of deformation and breakage of the insert member starts.

4. The vehicle seat according to claim 1, wherein the insert member is embedded in a front surface of the pad.

5. The vehicle seat according to claim 1, wherein
   the pad has a recess at the portion at which the head of the occupant is configured to be received, and
   the insert member is attached to the recess of the pad.

6. The vehicle seat according to claim 1, wherein the insert member is comprised of a rigid urethane foam.

7. The vehicle seat according to claim 1, wherein the groove extends in a top to bottom direction of the vehicle seat.

8. A vehicle seat provided in a vehicle, the vehicle seat comprising:
   a headrest having a pad; and
   an insert member that is provided in the pad of the headrest at a portion of the headrest at which a head of an occupant is configured to be received, wherein
   the insert member has a rigidity that is higher than a rigidity of the pad,
   the insert member is at least one of deformed and broken by a load applied when the head of the occupant sinks into the headrest after a rear-side collision occurs in the vehicle, and
   the insert member includes a groove that penetrates to and terminates at a predetermined depth in a planar front surface of the insert member that faces the head of the occupant during the rear-side collision.

9. The vehicle seat according to claim 8, wherein the groove is a starting portion at which the at least one of deformation and breakage of the insert member starts.

10. The vehicle seat according to claim 8, wherein the insert member is embedded in a front surface of the pad.

11. The vehicle seat according to claim 8, wherein
    the pad has a recess at the portion at which the head of the occupant is configured to be received, and
    the insert member is attached to the recess of the pad.

12. The vehicle seat according to claim 8, wherein the insert member is comprised of a rigid urethane foam.

13. The vehicle seat according to claim 8, wherein the groove extends in a top to bottom direction of the vehicle seat.

* * * * *